United States Patent
Riefe et al.

(10) Patent No.: US 6,641,167 B2
(45) Date of Patent: Nov. 4, 2003

(54) RESPONSIVE E/A SYSTEM FOR STEERING COLUMNS

(75) Inventors: Richard Kremer Riefe, Saginaw, MI (US); James R. Salois, Rochester Hills, MI (US); David Michael Byers, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/266,666

(22) Filed: Oct. 8, 2002

(65) Prior Publication Data

US 2003/0071451 A1 Apr. 17, 2003

Related U.S. Application Data

(60) Provisional application No. 60/329,837, filed on Oct. 16, 2001.

(51) Int. Cl.$^7$ ................................................. B62D 1/19
(52) U.S. Cl. ........................... 280/777; 188/374; 74/492
(58) Field of Search ..................... 280/777; 188/374; 74/492, 493; 91/166

(56) References Cited

U.S. PATENT DOCUMENTS

| | | | | | |
|---|---|---|---|---|---|
| 4,886,295 | A | * | 12/1989 | Browne | 280/777 |
| 5,542,336 | A | * | 8/1996 | Larkin | 91/166 |
| 5,788,278 | A | * | 8/1998 | Thomas et al. | 280/777 |
| 6,116,648 | A | * | 9/2000 | Holly et al. | 280/777 |
| 6,152,488 | A | * | 11/2000 | Hedderly et al. | 280/775 |
| 6,170,874 | B1 | * | 1/2001 | Fosse | 280/777 |
| 6,189,919 | B1 | * | 2/2001 | Sinnhuber et al. | 280/731 |
| 6,189,929 | B1 | * | 2/2001 | Struble et al. | 280/777 |
| 6,234,528 | B1 | * | 5/2001 | Ben-Rhouma et al. | 280/777 |
| 6,296,280 | B1 | * | 10/2001 | Struble et al. | 280/777 |
| 6,322,103 | B1 | * | 11/2001 | Li et al. | 280/777 |
| 6,375,220 | B1 | * | 4/2002 | Kamm | 280/777 |
| 6,478,333 | B1 | * | 11/2002 | Barton et al. | 280/777 |

* cited by examiner

Primary Examiner—Paul N. Dickson
Assistant Examiner—Ruth Ilan
(74) Attorney, Agent, or Firm—Michael D. Smith

(57) ABSTRACT

An energy absorbing device for a collapsible steering column of a vehicle includes an M-shaped plastically deformable strap for imposing a resistance to collapse of the steering column when the steering column collapses in a vehicle collision. An anvil adjusts the resistance to collapse imposed on the steering column by the strap. A controller produces a signal of a magnitude indicative of an amount of resistance needed to be imposed on the steering column by the strap to better protect from injury a driver seated behind the steering column at the time of the collision. An actuator receives the signal and actuates the anvil to adjust the amount of resistance imposed by the strap in accordance with the magnitude of the signal.

17 Claims, 2 Drawing Sheets

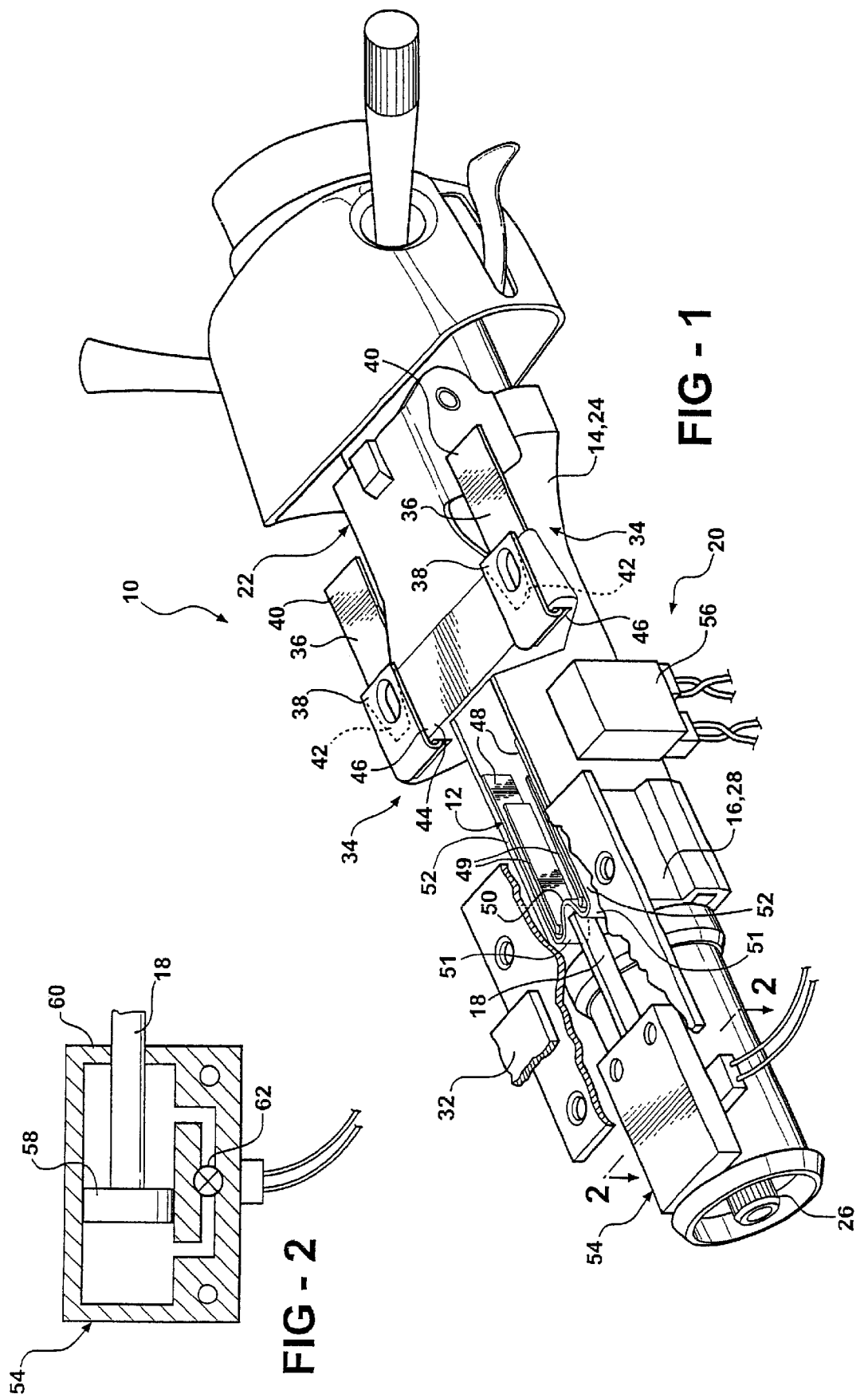

RESPONSIVE E/A SYSTEM FOR STEERING COLUMNS

REFERENCE TO RELATED APPLICATION

This application claims the benefit of U.S. Provisional Application No. 60/329,837 filed Oct. 16, 2001.

TECHNICAL FIELD

This invention relates generally to steering columns and more particularly to an energy absorbing device for a collapsible steering column.

BACKGROUND OF THE INVENTION

To protect a driver from severe injury in a frontal collision, many vehicles today are equipped with collapsible steering columns having energy absorbing devices to absorb some of the impact energy exerted on the driver's body during the collision. Typically such devices are designed to protect drivers of average size and weight in a collision of average severity, without taking into account the fact that drivers are not all of average size and weight and that collisions vary considerably in severity depending upon vehicle speed at the time of impact. U.S. Pat. No. 5,788,278 discloses an M-strap energy absorbing system for a collapsible column having fixed anvils about which the strap deforms to absorb energy. The energy absorption characteristics are non-adjustable during a crash event.

SUMMARY OF THE INVENTION

In accordance with the present invention, provision is made for a adjusting the amount of resistance to the collapse of the steering column depending on a number of conditions including but not limited to the weight of the driver, position of the driver's seat, and speed of the vehicle at impact. The device includes an energy absorber for imposing a resistance to collapse of the steering column when it collapses in a vehicle collision, and a load adjuster for adjusting the resistance to collapse imposed by the energy absorber. A controller is provided to produce a signal of a magnitude indicative of an amount of resistance needed to be imposed on the steering column to better protect from injury a driver seated behind the steering column at the time of the collision. The signal produced will be dependent upon the various parameters measured at the time of the collision. An actuator receives the signal and actuates the load adjuster to adjust the amount of resistance imposed in accordance with the magnitude of the signal.

More specifically, the energy absorbing device may comprise an elongated plastically deformable metal strap and the load adjuster may be in the form of an anvil. Preferably the strap is generally M-shaped having parallel legs and a generally V-shaped portion connecting corresponding ends of the legs. The anvil engages a concave side of the V-shaped portion and may be moved in opposite directions by the actuator to vary the amount of resistance to steering column collapse imposed by the strap.

Preferably the actuator is in the form of a hydraulic cylinder controlled by an electronic solenoid valve. Valves of this description have a very rapid response and can make adjustments in the position of the anvil in only a few milliseconds after impact, while the steering column is still collapsing.

Among the conditions that may be sensed and therefore employed to influence the position of the anvil, are the weight of the driver, the position of the driver's seat, and vehicle speed at the time of impact.

One object of this invention is to provide an energy absorbing device having the foregoing features and capabilities.

BRIEF DESCRIPTION OF THE DRAWINGS

Other objects, features and advantages of the invention will become more apparent as the following description proceeds, especially when considered with the accompanying drawings, wherein:

FIG. 1 is perspective view of a steering column of an automotive vehicle having an energy absorbing system constructed in accordance with a presently preferred embodiment of the invention;

FIG. 2 is a sectional view taken on the line 2—2 in FIG. 1;

DETAILED DESCRIPTION OF THE PREFERRED EMBODIMENT

Figure 3:
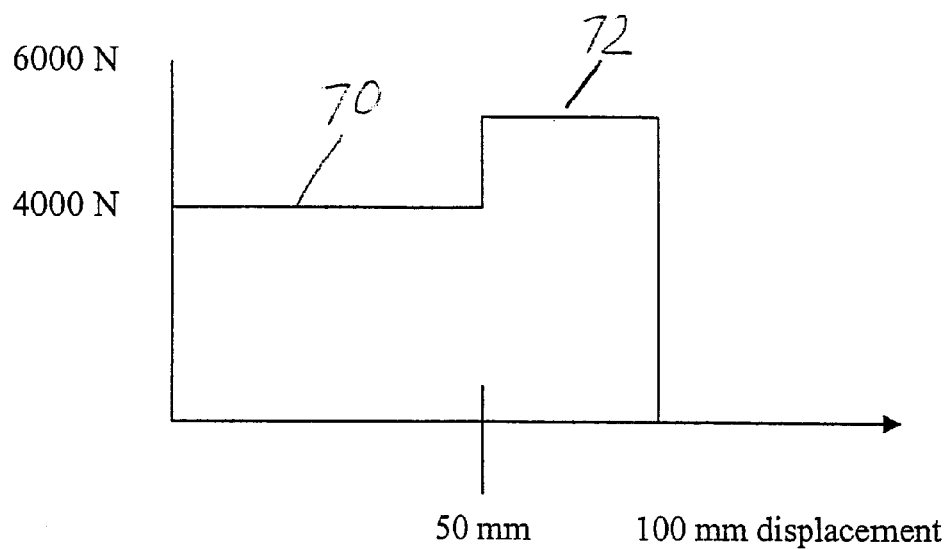
FIG. 3 is a force-displacement diagram indicating the amount of resistance applied to the steering column as it collapses.

A responsive energy absorbing (E/A) system constructed according to a presently preferred embodiment of the invention is shown generally at 10 in FIG. 1 and comprises an energy absorber in the form of at least one variable, plastically deformable metal strap 12 that is anchored to one component 14 of two relatively movable components 14, 16 reacting against a load adjuster in the form of an elongated anvil 18 carried on the second component 16 and operative to engage and deform the metal strap 12 in response to relative movement of the first and second components 14, 16 under controlled conditions. The anvil 18 is coupled to a control system 20 which is operative to control the position of the anvil 18 relative to the strap 12 in order to change the energy absorbing characteristics of the E/A system 10 in response to various inputs, some of which are described below.

FIG. 1 shows the E/A system 10 incorporated into a steering column assembly 22 of a vehicle (not shown). The steering column assembly 22 includes a steering column or housing 24 surrounding a steering shaft 26 that mounts a steering wheel (not shown) at its upper end and is operably coupled at its lower end to a steering mechanism (not shown) which steers the steerable wheels of the vehicle.

The steering column 24 is cradled by a lower mounting bracket 28 which is fixed by a mounting flange to support structure 32 of the vehicle (not shown). The mounting bracket 28 suspends the column 24 from the support structure 32, while enabling the column 24 to collapse or slide through the bracket 28 relative to the support structure 32 in the event of a vehicle crash under circumstances in which the driver forcibly strikes the upper end of the column 24, forcing the column to collapse relative to the support structure 32. The E/A system 10 manages the collapse of the column 24 in such manner as to control the dissipation of energy according to certain control parameters.

The overall E/A system 10 may include, in addition to the variable E/A strap 12, one or more passive E/A straps 34, such that the system 10 has both passive and variable E/A components. The passive E/A straps 34 may comprise, for example, one or more J-straps as illustrated in FIG. 1 which include plastically deformable metal strips 36 each having an anchored end 38 and a free end 40. Each anchored end 38 is connected to the support structure 32 of the vehicle and by a sheerable mount 42 to a sheer bracket 44 fixed to and movable with the column 24. The strips 36 are bent around anvils 46 on the bracket 44. In the event of a collision, a forward movement of the column 24 relative to the support structure 32 breaks the sheerable mount 42 free of the vehicle support structure and drives the sheer bracket 44 forward with the column 24, causing the anvils 46 to draw across the strips 36, and in so doing dissipate a predetermined amount of energy of the load applied to the steering column 24 from the impact of the driver of the vehicle. Accordingly, the E/A system 10 of the invention preferably has a passive component of energy absorption attributable to the passive straps 34, and a supplemental active or adaptive component attributable to the strap 12 to provide further energy dissipation in addition to that provided by the passive straps 34, depending upon input from the control system 20 which varies the energy absorption characteristics of the active or adaptive component, that is, the variable strap 12.

As shown in FIG. 1, the active E/A strap 12 is M-shaped. Legs 52 are wrapped around a set of laterally spaced stationary side anvils 49, presenting two outer bends or loops 51 of the strap 12. Upper ends 48 of the legs 52 are free. The lower ends of the legs 52 of the strap 12 are connected by a looped or generally V-shaped portion 50 disposed between and forward of the outer loops 51, giving the strap 12 the M-shape. The anvil 18 contacts the outer concave surface of the V-shaped portion 50. Forward movement of the column 24, and thus the anvils 49 urges the outer surface of the V-shaped portion against the anvil 18, causing the legs 52 of the strap 12 to bend around the anvils 49, increasing the length of the V-shaped portion 50.

According to the invention, the engagement and reaction between the outer surface of the V-shaped portion 50 of the strap 12 and the anvil 18 is adjustable in such manner as to vary the energy absorption characteristics of the strap 12 during collapse of the column 24. In the preferred embodiment, the anvil 18 is selectively movable in the axial direction, that is, parallel to the column 24. More specifically, the anvil 18 is coupled to an actuator 54 which governs the movement and position of the anvil 18 under the control of a controller 56 which is incorporated in and is a part of the control system 20. The actuator 54 preferably comprises a hydraulic piston 58 slidable in a cylinder 60. The piston 58 is connected to the lower end of the anvil 18. The cylinder 60 is fitted with a rapidly operating electronic solenoid valve 62 which controls the flow of hydraulic fluid to opposite sides of the piston 58 within the cylinder 60. When the valve 62 is closed, the piston 58 cannot move.

The controller 56 has sensors (not shown) which detect certain conditions that are present immediately after, or within milliseconds after, a crash, and generate a signal of a magnitude indicative of the amount of resistance to collapse of the steering column that is needed to best protect the driver. The signal is received by the solenoid valve which, through the cylinder 60, moves the anvil appropriately to adjust the amount of resistance imposed by the anvil upon the strap 12 in accordance with the magnitude of the signal.

Various parameters that can be measured by the controller 56 at the time of and during a crash includes, for example, vehicle speed, driver weight and driver seat position, steering column stroke, etc. In response to the measured value of one or more or all of these variables, the controller 56 controls the operation of the valves 62, and thus the position of the anvil 18 relative to the strap 12 during the crash event.

The electronic solenoid valve 62 is extremely fast-acting and capable of causing adjustment of the anvil 18 by the actuator 54 while the column 24 is still collapsing.

During a crash event, detected parameters may make it beneficial to fine-tune the adjustment of the position of the anvil 18 and thus modify the force-displacement curve to achieve optimum energy absorption under the given conditions. By controlling the movement of the anvil 18 relative to the strap 12, a number of different force-displacement curves can be developed. This enables the designer of E/A systems to tailor a vehicle's E/A system 10 to behave at peak performance to deliver optimum protection to the occupant of a vehicle under various crash scenarios. Such a system is readily adapted to different vehicles and takes into account virtually unlimited control variables to optimize the performance of the E/A system in virtually any vehicle under virtually any crash scenario through the engineered control of the actuator 54.

Referring to FIG. 3, a force-displacement diagram is shown in which reaction force imposed by the energy absorbing system 20 of this invention is plotted in Newtons along a vertical axis and steering column displacement is plotted in millimeters along a horizontal axis. In the event of a head-on collision, in which there is displacement of the steering column, the initial reaction force is shown along the section 70 of the curve and is a constant which may be approximately 4,000 Newtons. This initial reaction force is imposed on the steering column 24 by the passive straps 34 and also by the variable strap 12. In this initial reaction stage, the anvil 18 has been pre-positioned by the actuator 54 under the control of the solenoid valve 62, determined by such factors as weight of the driver and driver seat position. Then controller 20 senses the variables to be measured, such as vehicle speed, steering column stroke, etc., also taking into account driver weight and position, and transmits an appropriate signal to the solenoid valve 62 which thereupon opens the hydraulic circuit in the cylinder 60 to deliver hydraulic fluid to one side or the other of the piston 58, thus to adjust the position of the anvil 18 and in this case increase the amount of resistance force imposed on the steering column 24 to approximately 6,000 Newtons as represented by the portion of the curve designated 72. The increased resistance to force thus continues during the further collapse of the steering column.

Figure 4:
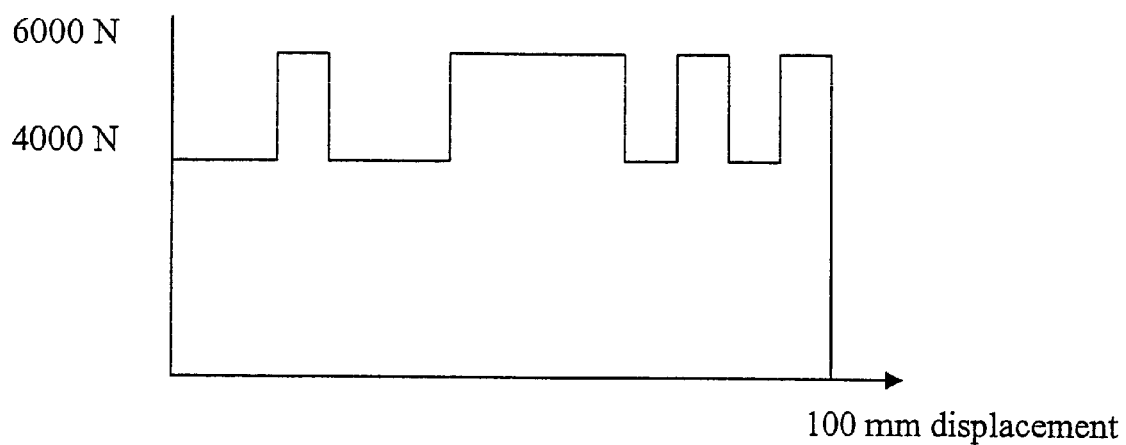
FIG. 4 is a view similar to FIG. 3 but shows a force-displacement curve of much greater complexity which may be developed to optimize the controlled application of force resisting collapse of the steering column.

By using current hydraulic valve technology in the M-strap actuator 60 and an appropriate controller 20, a force-displacement curve can be constructed of much greater complexity as indicated in FIG. 4 in which the amount of force resistance to collapse of the steering column rises and falls as the steering column collapses. The object, of course, is to protect the driver from serious injury by a controlled resistance during the entire collapse of the steering column.

What is claimed is:

1. An energy absorbing device for a collapsible steering column of a vehicle comprising:
   an energy absorber for imposing a resistance to collapse of the steering column when the steering column collapses in a vehicle collision,
   a load adjuster for adjusting the resistance to collapse imposed on the steering column by the energy absorber,
   a controller for producing a signal of a magnitude indicative of an amount of resistance needed to be imposed on the steering column by the energy absorber to absorb impact energy from a driver seated behind the steering column at the time of the collision, and an actuator for receiving the signal and for actuating the load adjuster to adjust the amount of resistance imposed by the energy absorber in accordance with the magnitude of the signal, wherein said actuator includes an anvil moveable in a direction parallel to the longitudinal axis of the steering column to vary the axial position of the anvil relative to the energy absorber thereby adjusting the amount of resistance imposed by said energy absorber.

2. The energy absorbing device of claim 1, wherein the magnitude of the signal produced by the controller is dependent at least in part upon the severity of the collision.

3. The energy absorbing device of claim 1, wherein the magnitude of the signal produced by the controller is dependent at least in part upon the position of the driver at the time of the collision.

4. The energy absorbing device of claim 1, wherein the magnitude of the signal produced by the controller is dependent at least in part upon the weight of the driver at the time of the collision.

5. The energy absorbing device of claim 1, wherein the magnitude of the signal produced by the controller is dependent at least in part on the speed of the vehicle at the time of the collision.

6. The energy absorbing device of claim 1, wherein the energy absorber includes an elongated plastically deformable strap, and the load adjuster includes an anvil in engagement with the strap.

7. The energy absorbing device of claim 6, wherein the strap is generally M-shaped having spaced apart, parallel legs and a generally V-shaped portion connecting corresponding ends of said legs, and said anvil engages a concave side of said generally V-shaped portion and is moved by said actuator in opposite directions generally parallel to said legs.

8. The energy absorbing device of claim 7, wherein said legs have outer bend portions wrapped about fixed side anvils on laterally opposite sides of said V-shaped portion.

9. The energy absorbing device of claim 8, wherein said actuator includes a solenoid-operated valve.

10. The energy absorbing device of claim 8, wherein the magnitude of the signal produced by the controller is dependent at least in part upon the severity of the collision.

11. The energy absorbing device of claim 8, wherein the magnitude of the signal produced by the controller is dependent at least in part upon the position of the driver at the time of the collision.

12. The energy absorbing device of claim 8, wherein the magnitude of the signal produced by the controller is dependent at least in part upon the weight of the driver at the time of the collision.

13. The energy absorbing device of claim 8, wherein the magnitude of the signal produced by the controller is dependent at least in part on the speed of the vehicle at the time of the collision.

14. The energy absorbing device of claim 8, wherein the magnitude of the signal produced by the controller is dependent upon at least one of the following parameters at the time of the collision, namely, the severity of the collision, the position of the driver, the weight of the driver and the speed of the vehicle.

15. The energy absorbing device of claim 14, wherein said actuator includes an electronic solenoid-operated valve.

16. An energy absorbing device for a steering column of a vehicle D collapsible along an axis of the column, said device comprising:

at least one anvil;

an energy absorbing strap extending in the axial direction of the column and across said at least one anvil and operative to confront and be urged against said at least one anvil in response to collapse of the column for absorbing energy of an impact;

an actuator coupled to said at least one anvil and operative to move said at least one anvil in a direction parallel to the axis of the column to vary the axial position of the at least one anvil relative to said energy absorbing strap.

17. The device of claim 16 wherein said energy absorbing strap comprises an M-strap.

* * * * *